United States Patent
Lee et al.

(10) Patent No.: US 11,175,812 B2
(45) Date of Patent: Nov. 16, 2021

(54) ELECTRONIC DEVICE AND CONTROL METHOD THEREFOR

(71) Applicant: Samsung Electronics Co., Ltd., Suwon-si (KR)

(72) Inventors: Ga-hee Lee, Seongnam-si (KR); Mee-jeong Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/763,326

(22) PCT Filed: Sep. 20, 2016

(86) PCT No.: PCT/KR2016/010438
§ 371 (c)(1),
(2) Date: Mar. 26, 2018

(87) PCT Pub. No.: WO2017/065418
PCT Pub. Date: Apr. 20, 2017

(65) Prior Publication Data
US 2019/0065037 A1    Feb. 28, 2019

(30) Foreign Application Priority Data

Oct. 14, 2015  (KR) .................. 10-2015-0143640

(51) Int. Cl.
*G06F 15/177* (2006.01)
*G06F 17/00* (2019.01)
(Continued)

(52) U.S. Cl.
CPC ........ *G06F 3/04847* (2013.01); *G06F 3/0482* (2013.01); *G06F 3/167* (2013.01);
(Continued)

(58) Field of Classification Search
CPC ...... H04W 4/70; G06F 3/167; G06F 3/04847; G06F 3/0482; G06F 40/166; H04L 67/125
(Continued)

(56) References Cited

U.S. PATENT DOCUMENTS 9,774,497 B2 * 9/2017 Britt .................. H04W 4/70
9,774,507 B2 * 9/2017 Britt .................. H04L 67/306
(Continued)

FOREIGN PATENT DOCUMENTS

CN      102244676 A    11/2011
CN      103379223 A    10/2013
(Continued)

OTHER PUBLICATIONS

Nate, Nest Thermostat Teardown, Published Oct. 4, 2015 via wayback at learn.soarkfun.com, pp. 1-15 (pdf).*
(Continued)

*Primary Examiner* — Manglesh M Patel
(74) *Attorney, Agent, or Firm* — Jefferson IP Law, LLP

(57) ABSTRACT

Disclosed is an electronic device including a communicator, a storage, and controller. The controller, through the communicator, transmits first state setting information for changing the state of at least one among the plurality of electronic devices to correspond to a started operation mode among the plurality of state setting information when one among the plurality of operation modes starts, and transmits second state setting information for changing the state of at least one among the plurality of electronic devices to correspond to at least one of the changed operation mode and the changed environment among the plurality of state setting information when one of the operation mode and the surrounding environment is changed.

14 Claims, 21 Drawing Sheets

| MODE | ENVIRONMENT | DEVICE | STATE SETTINGS |
|---|---|---|---|
| MOVIE MODE | AFTER 10 P.M. | TV | TV -VOLUME DOWN/ SLEEP SCHEDULE (2 HOURS) |
| MOVIE MODE | BRIGHT ENVIRONMENT | CURTAIN – CLOSE | CURTAIN – CLOSE |
| CLEANING MODE | RAIN | WINDOW | WINDOW - CLOSE |

(51) Int. Cl.
| | |
|---|---|
| *G06F 3/0484* | (2013.01) |
| *H04L 12/28* | (2006.01) |
| *H04N 21/422* | (2011.01) |
| *H04N 21/436* | (2011.01) |
| *H04N 21/41* | (2011.01) |
| *G06F 3/0482* | (2013.01) |
| *G06F 3/16* | (2006.01) |
| *H04L 29/08* | (2006.01) |

(52) U.S. Cl.
CPC ........ *H04L 12/2803* (2013.01); *H04L 67/125* (2013.01); *H04N 21/4131* (2013.01); *H04N 21/42202* (2013.01); *H04N 21/42204* (2013.01); *H04N 21/43615* (2013.01)

(58) Field of Classification Search
USPC ................................. 715/727, 200, 734, 736
See application file for complete search history.

(56) References Cited

U.S. PATENT DOCUMENTS

| | | |
|---|---|---|
| 2007/0286181 A1* | 12/2007 | Bushmitch .......... H04L 12/2803 370/356 |
| 2011/0283334 A1 | 11/2011 | Choi et al. |
| 2013/0139089 A1 | 5/2013 | Cho et al. |
| 2013/0285951 A1 | 10/2013 | Jeon et al. |
| 2014/0003820 A1 | 1/2014 | Lee et al. |
| 2014/0070925 A1 | 3/2014 | Shin et al. |
| 2014/0310222 A1 | 10/2014 | Davlos et al. |
| 2015/0006296 A1 | 1/2015 | Gupta et al. |
| 2015/0019342 A1 | 1/2015 | Gupta |
| 2015/0140990 A1 | 5/2015 | Kim et al. |

FOREIGN PATENT DOCUMENTS

| | | |
|---|---|---|
| CN | 103517120 A | 1/2014 |
| CN | 104620597 A | 5/2015 |
| KR | 10-2005-0047926 A | 5/2005 |
| KR | 10-2014-0033654 A | 3/2014 |
| KR | 10-1373291 B1 | 3/2014 |
| KR | 10-2015-0059081 A | 5/2015 |
| KR | 10-2015-0087733 A | 7/2015 |
| WO | 2015-020264 A1 | 2/2015 |

OTHER PUBLICATIONS

Chinese Office Action dated Aug. 4, 2020, issued in Chinese Application No. 201680057206.5.

Chinese Office Action dated Mar. 23, 2021, issued in Chinese Application No. 201680057206.5.

"LIU Dan et al., Intelligent Control and Adjustment System for Light-Sensitive Curtains in Smart Home, This non-patent research article was firstly published on Instrumentation Customer(initiatly published on Feb. 2014, DOI: 10.3969/j.issn.1671-1041.2014.01.018) and then was included into Wanfang Database on Feb. 27, 2014.".

"LIN Longsen et al., Smart home system design with voice control and wireless transmisssion based on environment monitoring, This non-patent research article was firstly published on Journal of Tonghua Normal University (initially published on Feb. 2014, DOI: 10.3969/j.issn.1008-7974.2014.02.001) and then was included into Wanfang Database an Jun. 17, 2015.".

Mircea Murar et al., Monitoring and controlling of smart equipments using Android compatible devices towards IoT applications and services in manufacturing industry.

Chinese Notice of Allowance dated Aug. 5, 2021, issued in Chinese Application No. 201680057206.5.

* cited by examiner

FIG. 3

| MODE | DEVICE | STATE SETTINGS |
|---|---|---|
| MOVIE MODE | TV<br>WINDOW | TV-TURN ON, HDMI MODE<br>WINDOW - CLOSE |
| CLEANING MODE | WINDOW<br>CURTAIN<br>RADIO | WINDOW - OPEN<br>CURTAIN - OPEN<br>RADIO - TURN ON, CD - PLAY |
| SLEEP MODE | LIGHTING<br>AIR CONDITIONER | LIGHTING - TURN ON<br>AIR CONDITIONER -<br>SLEEP SCHEDULE (2 HOURS) |

FIG. 4

| ENVIRONMENT | DEVICE | STATE SETTINGS |
|---|---|---|
| AFTER 10 P.M. | TV<br>RADIO | TV/RADIO – VOLUME DOWN |
| RAIN | WINDOW<br>CURTAIN | WINDOW - OPEN<br>CURTAIN - OPEN |
| BELOW 15°C | AIR CONDITIONER | AIR CONDITIONER - TURN OFF |

FIG. 5

| MODE | ENVIRONMENT | DEVICE | STATE SETTINGS |
|---|---|---|---|
| MOVIE MODE | AFTER 10 P.M. | TV | TV -VOLUME DOWN/ SLEEP SCHEDULE (2 HOURS) |
| MOVIE MODE | BRIGHT ENVIRONMENT | CURTAIN – CLOSE | CURTAIN – CLOSE |
| CLEANING MODE | RAIN | WINDOW | WINDOW - CLOSE |

FIG. 6

| MODE | USER A | USER B | USER C |
|---|---|---|---|
| MOVIE MODE | TV-HDMI<br>WINDOW – CLOSE | TV-CABLE<br>WINDOW – OPEN (70%) | TV-NETWORK<br>WINDOW – OPEN (30%) |
| CLEANING MODE | WINDOW – OPEN<br>CURTAIN – OPEN | WINDOW – OPEN<br>CURTAIN – CLOSE | WINDOW – OPEN<br>CURTAIN – OPEN (50%) |
| SLEEP MODE | LIGHTING – TURN OFF<br>AIR CONDITIONER<br>– TURN OFF | LIGHTING – LAMINATION<br>INTENSITY 20% BRIGHTNESS<br>AIR CONDITIONER - SLEEP<br>SCHEDULE (1 HOUR) | LIGHTING – LAMINATION<br>INTENSITY 5% BRIGHTNESS<br>AIR CONDITIONER – AUTO<br>CONTROL (MAINTAIN 26°C) |

FIG. 7

| DEVICE (301) | STATE (700) |
|---|---|
| WINDOW | OPEN |
| LIGHTING | LAMINATION INTENSITY 80% BRIGHTNESS |
| RADIO | TURN OFF |

ELECTRONIC DEVICE AND CONTROL METHOD THEREFOR

TECHNICAL FIELD

The disclosure relates to an electronic device, and more particularly to an electronic device for controlling a plurality of external electronic devices connected thereto and a control method thereof.

BACKGROUND ART

Internet of Things (IOT) refers to a new information communication-based infrastructure for materializing a ubiquitous space in which all things in the world are connected via a network so that communication can be made between people and things and between things anytime or anywhere. Such a ubiquitous space begins with intellectualization of an environment or things as computing devices having specific functions are embedded in the environment and the things The IOT is technology for leading us to a more convenient and safer life. FIG. 1 illustrates an example of a conventional IOT. The IOT may be variously materialized, and may for example be achieved by a plurality of external electronic devices 2-*a*~2-*n* and a hub device 1 connecting with and controlling the plurality of external electronic devices 2-*a*~2-*n*. The hub device 1 may include an input section for receiving a command from a user, an output section for providing operation information to a user, etc. or may be configured to communicate with separate input/output devices. The hub device 1 may control the plurality of external electronic devices 2-*a*~2-*n* at a time in response to a user's command, and may include a storage configured to previously set such a command.

DISCLOSURE

Technical Problem

However, the hub device 1 for providing a conventional IOT service merely provides a signal for controlling the plurality of external electronic devices 2-*a*~2-*n* in response to a user's command without considering change in surrounding environments and the like, and is thus inconvenient since a user has to control the plurality of external electronic devices 2-*a*~2-*n* based on his/her own determination. Further, a user has to inconveniently input an individual command again to return the plurality of external electronic devices 2-*a*~2-*n* to their previous states after finishing operations.

Technical Solution

The object of the disclosure is conceived to solve the foregoing problems, and provides an electronic device which directly controls at least one electronic device or makes a recommendation to a user when there is a change in an operation mode or an environment during the operation mode for controlling a plurality of external electronic devices.

To achieve the foregoing objects, there is provided an electronic device including: a communicator configured to communicate with a plurality of electronic devices having a plurality of changeable states; a storage configured to store a plurality of operation modes relevant to the plurality of electronic devices, and a plurality of pieces of state setting information mapped on to a plurality of surrounding environments and provided for changing the states of the plurality of electronic devices; and a controller configured to, through the communicator, transmit first state setting information for changing the state of at least one among the plurality of electronic devices to correspond to a started operation mode among the plurality of pieces of state setting information when one among the plurality of operation modes starts, and transmit second state setting information for changing the state of at least one among the plurality of electronic devices to correspond to at least one of the changed operation mode and the changed environment among the plurality of pieces of state setting information when one of the operation mode and the surrounding environment is changed while the operation mode is in progress.

The controller may transmit the first state setting information, which is for changing the state of at least one among the plurality of electronic devices to correspond to the surrounding environment and the started operation mode, among the plurality of pieces of state setting information, when one among the plurality of operation modes starts, thereby changing the state of the electronic device by taking not only the operation mode but also the surrounding environment into account.

The electronic device may further include an output section, wherein the controller controls the output section to output information about at least one electronic device to be changed in state among the plurality of electronic devices, thereby providing a user the information about the electronic device to be changed in state.

The information may include information about the state of the electronic device to be changed, thereby providing a user the information about how the state of the electronic device is changed.

The output section may include a loudspeaker configured to output a sound including information about at least one electronic device, of which state will be changed, among the plurality of electronic devices, thereby acoustically providing a user the information.

The output section may include a display configured to display a user interface (UI) including an item corresponding to at least one electronic device, of which state will be changed, among the plurality of electronic devices, thereby visually providing a user the UI.

The electronic device may further include a user command input section, wherein the information includes information about a plurality of candidate electronic devices selectable as an electronic device, of which state will be changed, among the plurality of electronic devices, and the controller changes the state of at least one candidate electronic device selected among the plurality of candidate electronic devices by a user through the user command input section, thereby making a user change the state of the electronic device desired among the list of recommended electronic devices.

The change of the operation mode may include termination of the operation mode, thereby changing the state of at least one electronic device to cope with the surrounding environment or another operation mode when the operation mode terminates.

The controller may be configured to store information about the states previous to the change of the plurality of electronic devices in the storage when the operation mode starts, and return the state of the electronic device to the stored state previous to the change when the operation mode terminates, thereby solving a problem of inconvenience that a user has to return the respective states of the used electronic devices as the operation mode terminates.

The operation mode may be changeable in accordance with at least one operation among the plurality of electronic devices, thereby changing the operation mode by sensing the use or termination of at least one electronic device while the operation mode is in progress.

The surrounding environment may include at least one of a timeslot, illumination intensity, dust, temperature, humidity and the like sensing information, and weather, thereby making the electronic device change the state of at least one electronic device by sensing and considering the time slot, the illumination intensity, the weather, etc.

At least one of the first state setting information and the second state setting information may include information about a user favorite state, which corresponds to the operation mode and the surrounding environment when the state is changed, among a plurality of user favorite states relevant to the plurality of electronic devices, so that the electronic device can change the state of the electronic device more preferred by each user in not only the preset operation mode and the surrounding environment but also the corresponding mode.

Further, to achieve the foregoing objects, there is provided a method of controlling an electronic device communicable with a plurality of electronic devices having a plurality of changeable states, the method including: storing a plurality of operation modes relevant to the plurality of electronic devices, and a plurality of pieces of state setting information mapped on to a plurality of surrounding environments and provided for changing the states of the plurality of electronic devices; and transmitting first state setting information for changing the state of at least one among the plurality of electronic devices to correspond to a started operation mode among the plurality of pieces of state setting information when one among the plurality of operation modes starts; and transmitting second state setting information for changing the state of at least one among the plurality of electronic devices to correspond to at least one of the changed operation mode and the changed environment among the plurality of pieces of state setting information when one of the operation mode and the surrounding environment is changed while the operation mode is in progress.

The transmitting of the first state setting information may include: transmitting the first state setting information, which is for changing the state of at least one among the plurality of electronic devices to correspond to the surrounding environment and the started operation mode, among the plurality of pieces of state setting information, when one among the plurality of operation modes starts, thereby changing the state of the electronic device by taking not only the operation mode but also the surrounding environment into account.

The method may further include outputting information about at least one electronic device to be changed in state among the plurality of electronic devices, through an output section, thereby providing a user the information about the electronic device to be changed in state.

The information may include information about the state of the electronic device to be changed, thereby providing a user the information about how the state of the electronic device is changed.

The output section may include a loudspeaker configured to output a sound including information about at least one electronic device, of which state will be changed, among the plurality of electronic devices, thereby acoustically providing a user the information.

The output section may include a display configured to display a user interface (UI) including an item corresponding to at least one electronic device, of which state will be changed, among the plurality of electronic devices, thereby visually providing a user the UI.

The information may include information about a plurality of candidate electronic devices selectable as an electronic device, of which state will be changed, among the plurality of electronic devices, and the transmitting of the second state setting information may comprise transmitting the second state setting information for changing the state of at least one candidate electronic device selected among the plurality of candidate electronic devices by a user through the user command input section, thereby making a user change the state of the electronic device desired among the list of recommended electronic devices.

The change of the operation mode may include termination of the operation mode, thereby changing the state of at least one electronic device to cope with the surrounding environment or another operation mode when the operation mode terminates.

The transmitting of the first state setting information may include storing information about the states previous to the change of the plurality of electronic devices when the operation mode starts, and the transmitting of the second state setting information may include transmitting the second state setting information for returning the state of the electronic device to the stored state previous to the change when the operation mode terminates, thereby solving a problem of inconvenience that a user has to return the respective states of the used electronic devices as the operation mode terminates.

The operation mode may be changeable in accordance with at least one operation among the plurality of electronic devices, thereby changing the operation mode by sensing the use or termination of at least one electronic device while the operation mode is in progress.

The surrounding environment may include at least one of a timeslot, illumination intensity, and weather, thereby making the electronic device change the state of at least one electronic device by sensing and considering the time slot, the illumination intensity, the weather, etc.

At least one of the first state setting information and the second state setting information may include information about a user favorite state, which corresponds to the operation mode and the surrounding environment when the state is changed, among a plurality of user favorite states relevant to the plurality of electronic devices, so that the electronic device can change the state of the electronic device more preferred by each user in not only the preset operation mode and the surrounding environment but also the corresponding mode.

Advantageous Effects

As described above, according to the present invention, it is possible to sense a change in an operation mode or surrounding environment during the operation mode for controlling a plurality of external electronic devices, and control at least one electronic device or make a recommendation to a user in accordance with the changed operation mode or environment.

DESCRIPTION OF DRAWINGS

FIG. 3 illustrates information about a plurality of external electronic devices and their state settings, which are mapped onto a plurality of operation modes, stored in a storage according to one embodiment of the present invention.

FIG. 4 illustrates information about a plurality of external electronic devices and their state settings, which are mapped onto a plurality of surrounding environments, stored in a storage according to one embodiment of the present invention.

FIG. 5 illustrates information about a plurality of external electronic devices and their state settings, which are mapped onto a plurality of operation modes and surrounding environments, stored in a storage according to one embodiment of the present invention.

FIG. 6 illustrates information about the external electronic devices and their state settings in operation modes, which are preferred by a plurality of users, stored in a storage according to one embodiment of the present invention.

FIG. 7 illustrates state information of a plurality of external electronic devices before starting an operation mode, stored in a storage according to one embodiment of the present invention.

BEST MODE

Below, embodiments of the disclosure will be described with reference to accompanying drawings so as to be easily realized by a person having ordinary skill in the art to which the disclosure pertains. The disclosure may be materialized variously without being limited to the embodiments set forth herein. To describe the disclosure more clearly, unrelated parts are omitted, and like numerals refer to the same or similar elements throughout the specification.

Figure 1:
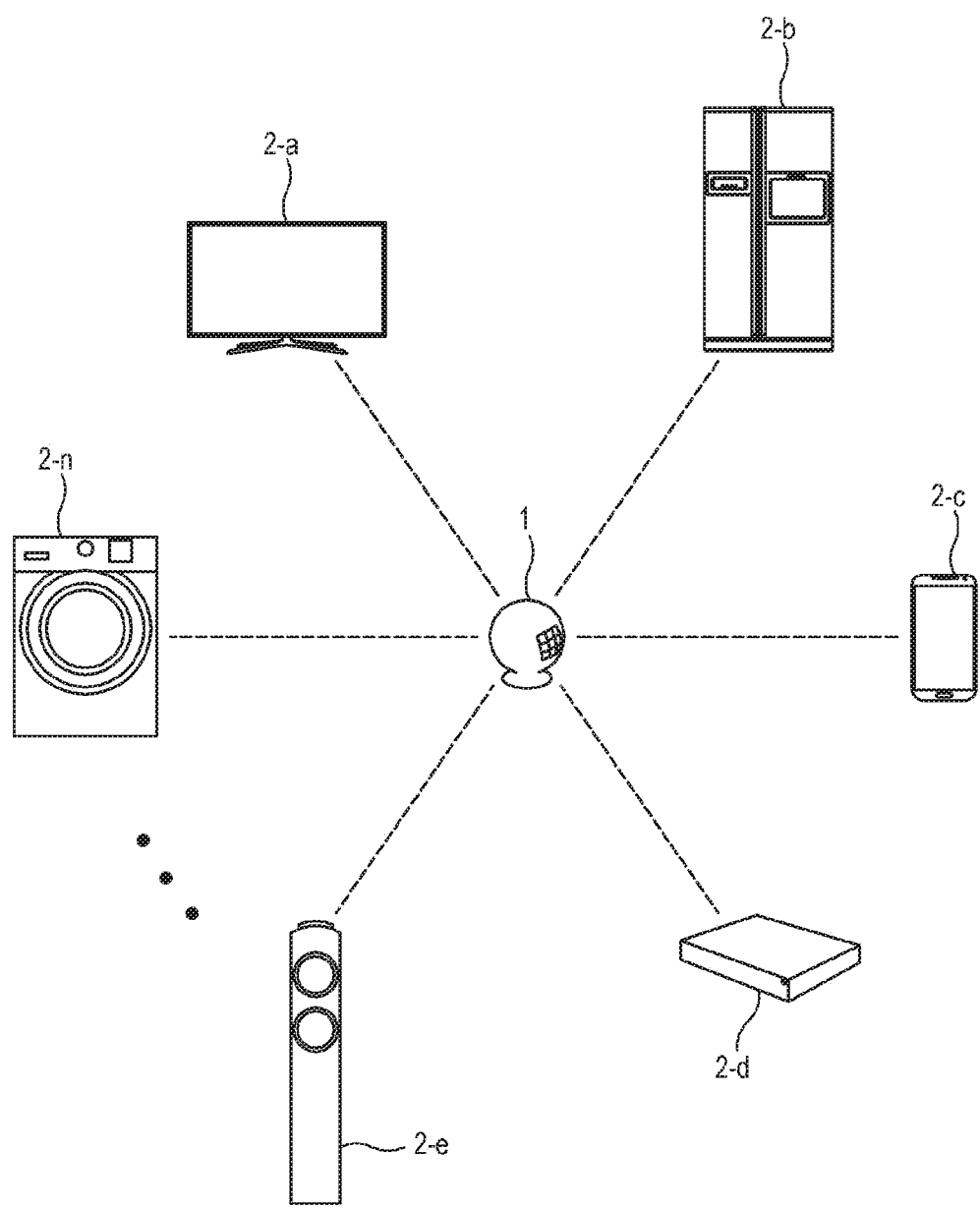
FIG. 1 illustrates an example of a conventional IOT system.
Figure 2:
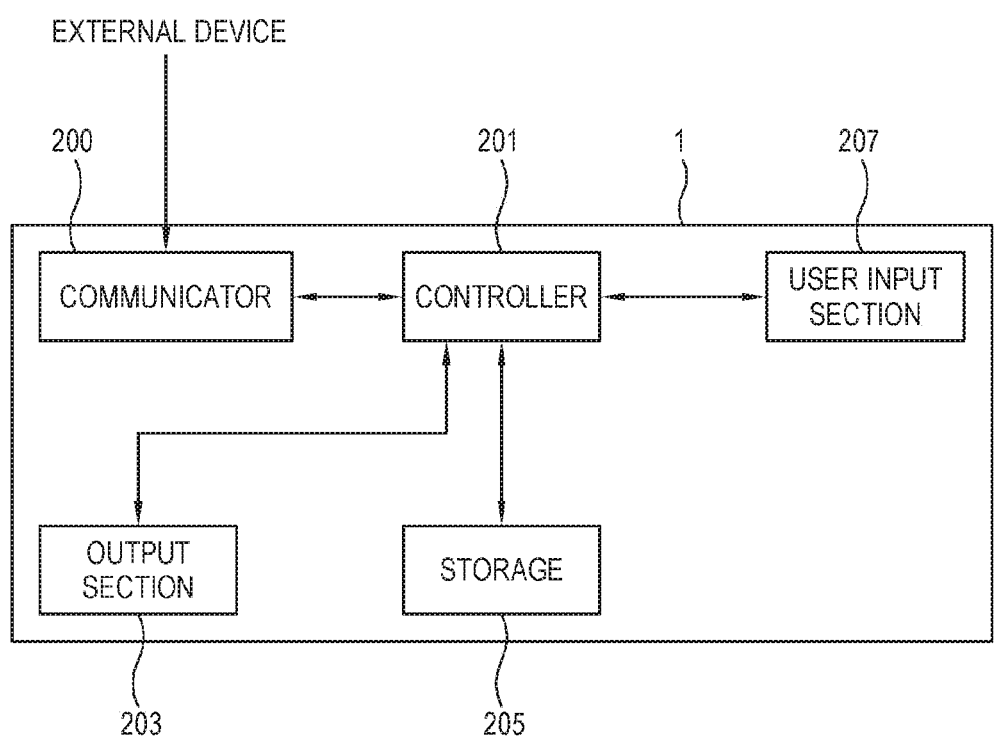
FIG. 2 is a block diagram of an electronic device according to one embodiment of the present invention.

FIG. 2 is a block diagram of an electronic device according to one embodiment of the present invention. To control a plurality of external electronic devices 2-*a*~2-*n*, an electronic device 1 shown in FIG. 2 includes a communicator 200, a controller 201, an output section 203, a storage 205 and a user command input section 207.

The electronic device 1 according to the disclosure may be used as a hub device and configured to store information about a plurality of operation modes and a plurality of pieces of state setting information for changing states of a plurality of external electronic devices 2-*a*~2-*n* corresponding to each operation mode. When at least one among the plurality of operation modes begins in response to a user's selection, the electronic device 1 may transmit the state setting information for changing the state to at least one external electronic device 2-*a*~2-*n* corresponding to the operation mode among the plurality of external electronic devices 2-*a*~2-*n*. According to another embodiment, the electronic device 1 may include a server that stores information about a plurality of operation modes and a plurality of pieces of state setting information for changing the states of the plurality of external electronic devices 2-*a*~2-*n* corresponding to each mode; and a terminal that provides through an output section a user interface (UI) for allowing a user to select a specific operation mode to be started, receives information about a selected operation mode and the state setting information for changing the state of the plurality of external electronic devices 2-*a*~2-*n* to correspond to the operation mode from the server when the user selects the specific operation mode to be started, and transmit the received information to the plurality of external electronic devices 2-*a*~2-*n*.

The electronic device 1 is not limited to the foregoing hub device, server, terminal or the like, but may be materialized by various kinds of electronic devices 1 capable of controlling the plurality of external electronic devices 2-*a*~2-*n*.

The communicator 200 is configured to make the electronic device 1 communicate with the plurality of external electronic devices 2-*a*~2-*n* directly or via a network or the like, and may include a plurality of connection ports according to various standards such as high definition multimedia interface (HDMI), a universal serial bus (USB), etc. The communicator 200 may perform wired communication with a plurality of servers through a wired local area network (LAN). The communication performed in the communicator 200 may include wireless communication. In case of the wireless communication, the communicator 200 may include a radio frequency (RF) circuit for transmitting and receiving an RF signal. The communicator 200 may perform the wireless communication through a wireless network by a wireless LAN, wireless fidelity (Wi-Fi), etc. In addition, the communicator 200 may perform the wireless communication with the external device or network by Bluetooth or the like. Further, the communicator 200 may additionally perform communication for voice over Internet protocol (VoIP), message transceiving, etc.

The output section 203 is configured to provide various pieces of information to a user. The output section 203 may include one of a loudspeaker for outputting a sound and a display for outputting an image. The loudspeaker includes an internal loudspeaker to provide information about the plurality of external electronic devices 2-*a*~2-*n*, states of which are changed, as a sound to a user. The display displays an image, and includes a display device such as a liquid crystal display (LCD) or the like. In this embodiment, the display displays a user interface (UI) involving information about at least one external electronic device 301, the state of which is changed, among the plurality of external electronic devices 2-*a*~2-*n*.

This embodiment describes that the output section 203 is either of the loudspeaker or the display, but this is for illustrative purposes only. According to a different embodiment of the present invention, the electronic device 1 may be connected to a separate external device, i.e. a sound output device or a display device via the output section 203 and provides information to a user. In other words, according to the different embodiment of the present invention, the output section 203 may include a connector; and an external audio output device such as an earphone, a headset, an external loudspeaker, etc. or an external video output device such as a TV monitor, etc. may be connected to the electronic device 1.

The storage 205 is configured to store a plurality of operation modes as a set of operations that the plurality of external electronic devices 2-*a*~2-*n* has, and the plurality of pieces of state setting information for changing the states of the plurality of external electronic devices 2-*a*~2-*n* mapped onto the plurality of operation modes and surrounding environments. The storage 205 may be provided as a nonvolatile memory (or writable read only memory (ROM) that reflects changes and retains data even though power supplied to the electronic device 1 is cut off. In other words, the storage 205 may be provided as one of a flash memory, an erasable and programmable read only memory, and an electrically erasable and programmable read only memory (EEPROM). The surrounding environments may include a timeslot, change in ambient illumination intensity, change in surrounding weather, etc. The storage 205 may be configured to further store information about the state prior to change of the plurality of external electronic devices 2-*a*~2-*n*, when the operation mode begins.

The electronic device 1 may further include a sensor section for sensing the change in the plurality of external electronic devices 2-*a*~2-*n* and the surrounding environment. The sensor section is included in the electronic device 1, and senses temperature, weather, other motions, etc., thereby transmitting a sensing value to the controller 201. Further, as one among the plurality of external electronic devices 2-*a*~2-*n* capable of communicating with the electronic device 1 through the communicator 200, a separate sensing device may sense a surrounding environment, etc. and the electronic device 1 may receive a signal sensed by the sensing device through the communicator 200.

The user command input section 207 may directly receive a control command through a control panel, or may receive a remote control signal including a user's control command from a remote controller. The user command input section 207 may be also materialized in the form of a touch pad, or materialized by a touch screen for sensing a user's touch input onto the display. Further, the user command input section 207 may include a microphone or the like for recognizing a user's voice command A user may make an input for the start, termination, change, etc. of the operation mode through the user command input section 207, and change the state setting information corresponding to the operation mode in accordance with his/her tastes.

The controller 201 performs general control of the electronic device 1 according to one embodiment of the present invention.

In more detail, the controller 201 may control one among the plurality of operation modes to start in response to a user's command received through a user's user command input section 207 or an operation of at least one among the plurality of external electronic devices 2-*a*~2-*n*. To make the operation mode start, the controller 201 transmits the state setting information for changing the state of each external electronic device 301 to at least one external electronic device 301 corresponding to the started operation mode through the communicator 200.

Further, the controller 201 performs control to sense whether or not there is a change in an ongoing operation mode or a surrounding environment, and transmits the state setting information for changing the state to at least one external electronic device 301 through the communicator 200 so as to correspond to the changed operation mode or surrounding environment when there is the change. The operation mode may be changed in response to a user's start command input or use of at least one external electronic device.

For example, when a predetermined period of time elapses after a user starts using a vacuum cleaner, the electronic device 1 senses it and starts a cleaning mode such as opening a window, turning on a radio, etc. That a user makes the vacuum cleaner enter a charging mode and turns on a TV may cause the cleaning mode to be terminated, and thus a new operation mode such as a TV watching mode, etc. may start. Further, when the cleaning mode is in progress and there is a change in the surrounding environment, for example, it begins to rain in a state that the window is open, the controller 201 may transmit the state setting information for closing the window to thereby cope with the changed surrounding environment even while cleaning.

The controller 201 may also change the state of at least one external electronic device 301 in accordance with the operation mode and the surrounding environment when the operation mode begins. For example, the window may not be open when the cleaning mode starts in case of rain, and the volume of a TV may be turned down to a predetermined level or lower when a movie mode starts after 10 P.M.

Further, the controller 201 may provide information about at least one external electronic device 301, the state of which will be changed, to a user before changing the state of at least one external electronic device. The controller 201 changes the state of at least one external electronic device 301 through a user's simple approval, or changes the state of at least one external electronic device selected through the user command input section 207 by a user who gets the provided information. To provide information about at least one external electronic device to a user, the controller 201 may control the display to display a UI including items of the electronic device or the loudspeaker to output a sound as described above.

The controller 201 may also perform control to transmit the state setting information for returning to the state previous to the operation mode, with reference to the states of the plurality of external electronic devices 2-a~2-n before the operation mode stored in the storage 205, after terminating the ongoing operation mode. The operation mode may be terminated when a user inputs a mode termination command or when it is sensed that use of a specific electronic device is started or terminated.

For example, when a user selects the movie mode to be started, the electronic device 1 transmits the state setting information to each external electronic device 301 in order to decrease illumination intensity of lighting, pull a curtain, and make settings of a TV be suitable for watching a movie. When the movie is over, a user will turn off the TV. When it is sensed that the TV is turned off, the electronic device 1 determines that the movie mode is terminated, and transmits the state setting information to each electronic device to increase the illumination intensity of the lighting and draw back the curtain.

The controller 201 may not always return the states of the plurality of external electronic devices 2-a~2-n to the state previous to the beginning of the operation mode, but change the state of at least one external electronic device 301 to correspond to a changed surrounding environment by sensing whether there is a change in the surrounding environment such as weather, time, etc. That is, although the movie mode is terminated as a user stops watching the movie in the state that the window is closed and the lighting is dimmed in accordance with the beginning of the movie mode, the window may be not opened or the lighting may be not turned up by taking a user's bedtime into account when it is determined that the timeslot is late at night.

The controller 201 is not limited to the foregoing operations and functions, but may have various methods of the operations of the plurality of external electronic devices 2-a~2-n.

FIG. 3 illustrates at least one electronic device 301 and its state setting information 303, which are mapped onto a plurality of operation modes, stored in the storage according to one embodiment of the present invention.

The storage 205 may be configured to tabulate at least one external electronic device 301 and its state setting information 303, which are mapped onto the plurality of operation modes 300.

The plurality of operation modes 300 may be sorted into a movie mode, a cleaning mode, a sleep mode, etc. and tabulated according to use as shown in FIG. 3, but the terms of the operation modes are not limited to those shown in FIG. 3. Alternatively, the plurality of operation modes may be previously set to control the plurality of external electronic devices 301 at a point of time when the electronic device 1 is provided to a user, or a user may directly give various names to the operation modes.

Each operation mode 300 is mapped onto at least one external electronic device 301 and the state setting information 303. For example, the state setting information 303 may be stored so that the electronic device 1 changes settings for a movie, for example, turns on the TV and selects an external input for an HDMI, etc., closes the window, and dims the lighting when the movie mode starts. Further, the state setting information 303 may be stored to open the window and the curtain, turn off the TV and turn on the radio when the cleaning mode starts.

The name of each operation mode 300, at least one external electronic device 301 and the state setting information 303 to be controlled, and the like as described above are given only for illustrative purposes. Alternatively, various external electronic devices 301 and their state setting information 303 may be mapped onto various operation modes 300.

FIG. 4 illustrates at least one electronic device 301 and its state setting information 303, which are mapped onto a plurality of surrounding environments, stored in the storage according to one embodiment of the present invention.

The storage 205 may be configured to store a plurality of surrounding environments 400, and at least one external electronic device 301 and the state setting information 303 mapped onto the plurality of surrounding environments 400.

The plurality of surrounding environments 400 may include a timeslot, weather, temperature, ambient illumination intensity, etc.

Each surrounding environment 400 is mapped onto at least one corresponding external electronic device 301 and its state setting information 303. For example, at least one external electronic device 301 and its state setting information 303 may be mapped onto the surrounding environments 400 and stored to turn down the volume of the TV, the radio and the like external electronic devices 301 capable of outputting a sound when the time slot is late at night; change illumination intensity of lighting in a house in accordance with changes in the ambient illumination intensity; close the window or turn on the furnace when the temperature suddenly falls, it rains and the like variation in weather, and so on.

The surrounding environment 400, the external electronic device 301 and the state setting information 303 described above are given only for illustrative purposes. Alternatively, there may be various surrounding environments 400, at least one external electronic device 301 to be mapped onto the change of the surrounding environment 400, and various kinds of state setting information 303 for changing the states of the external electronic device 301.

FIG. 5 illustrates a plurality of external electronic devices and their state setting information, which are mapped onto a plurality of operation modes and surrounding environments, stored in the storage according to one embodiment of the present invention.

The storage 205 may be configured to store at least one external electronic device 301 and the state setting information 303 mapped onto the plurality of operation modes 300 and surrounding environments 400. That is, the controller 201 changes the state of the external electronic device 301 with reference to the surrounding environment 400 as well as the operation mode 300.

For example, when a user starts the movie mode after 10 P.M., the electronic device 1 may perform control to turn down the volume and set a bedtime schedule, and perform control not to close the curtain in dark environments.

This means that the controller 201 not only changes the state of at least one external electronic device 301 by sensing change in the surrounding environment 400 while the operation mode 300 is in progress, but also changes the state of at least one external electronic device 301 by taking the surrounding environment 400 when the operation mode 300 begins.

FIG. 6 illustrates the external electronic devices and their state setting information in the operation modes, which are preferred by a plurality of users, stored in the storage according to one embodiment of the present invention.

In even the same operation mode 300, preferred states of the external electronic device 301 may be varied depending on users. According to one embodiment of the present invention, the storage 205 is configured to store user preference state information 600 about at least one external device 301, which is preferred according to a plurality of users and mapped onto the operation modes 300.

For example, in case of the movie mode, a user A may prefer to use an HDMI external input to the TV, a user B may prefer to use a cable broadcasting signal, and a user C may prefer to use a network. In case of the sleep mode, a user A may prefer completely turning off lighting, but another user may prefer low illumination intensity of the lighting.

The user preference state information 600 may be input by each corresponding user, or may be stored with the external electronic devices 301 and their state setting information 303 determined as preferred by a user with regard to the operation mode 300 or the surrounding environment 400 in the storage 205 based on use of users.

FIG. 7 illustrates setting states 700 of a plurality of external electronic devices 301 before starting an operation mode, stored in the storage according to one embodiment of the present invention. The storage 205 may be configured to store the current setting states 700 of the plurality of external electronic devices 301 when each operation mode 300 begins. When the ongoing operation mode 300 is terminated, the controller 201 may ask a user for his/her intention, and return the state 700 of the external electronic device 301, the setting state of which is changed as the operation mode 300 is in progress, to that previous to the operation mode 300. However, in accordance with the changes of the surrounding environment 400, at least one external electronic device 301 may be changed to have another setting state 700 corresponding to the changed surrounding environment 400 as describe above.

According to another embodiment, the electronic device 1 may be configured to periodically sense and store the current setting state 700 of the plurality of external electronic devices 301, and inform a user of the current states of the plurality of external electronic devices 301. That is, although the operation mode does not begin, the electronic device 1 is configured to always store the information about the current setting state 700 of the plurality of external electronic devices 301, and generates the state setting information based on the stored current setting state 700 when the operation mode begins. That is, in the state where the window is closed, the electronic device 1 does not have to transmit the state setting information for closing the window as the movie mode begins. Further, the electronic device 1 transmits the state setting information for changing a mode when the TV is being turned on but operates in a mode unsuitable for a movie.

Figure 8:
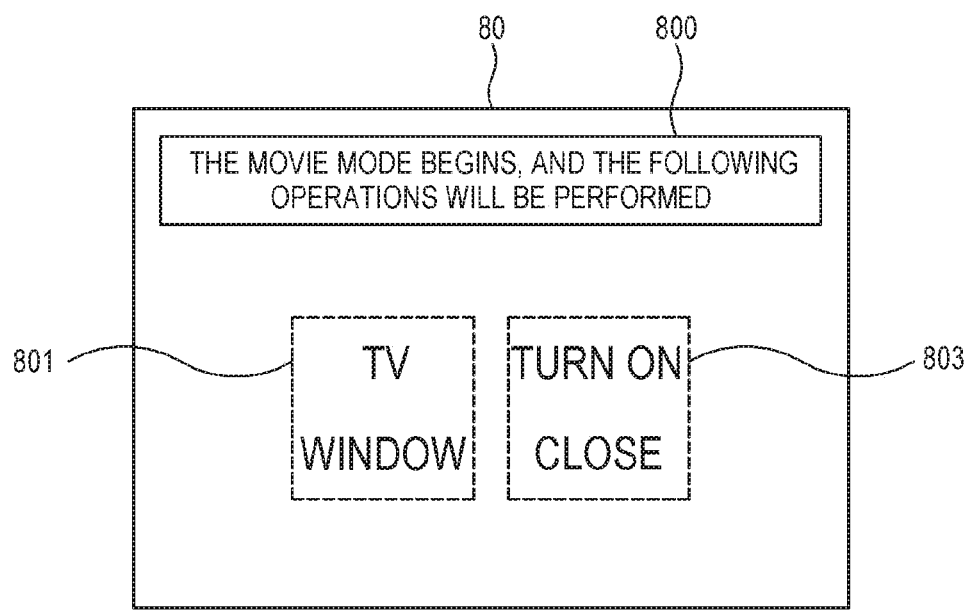
FIG. 8 illustrates a display of displaying a user interface (UI) including information about at least one external electronic device, a state of which will be changed, according to one embodiment of the present invention.
Figure 9:
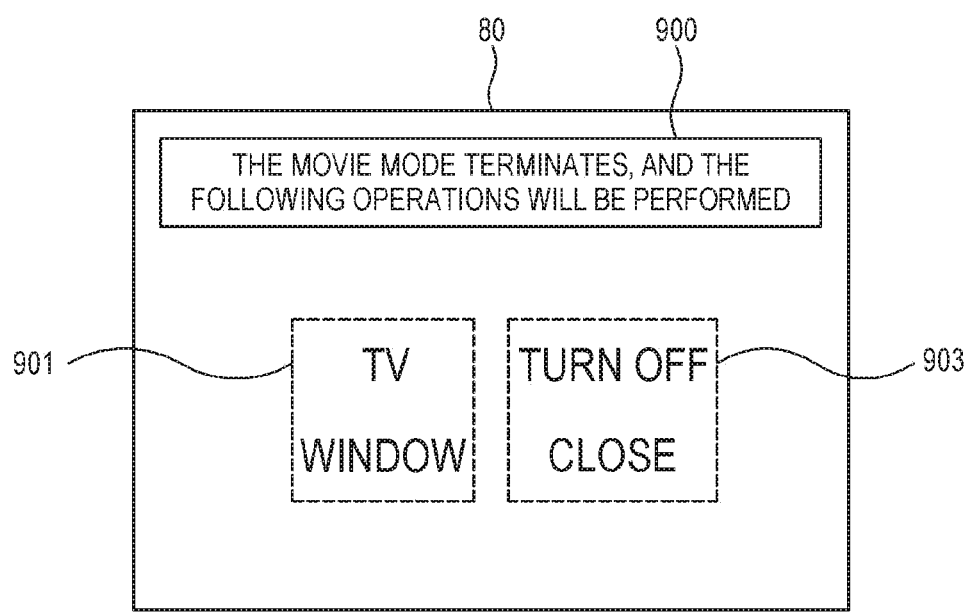
FIG. 9 illustrates a display of displaying a UI including information about at least one external electronic device, a state of which will be changed, according to one embodiment of the present invention.

FIGS. 8 and 9 illustrate a display of displaying a user interface (UI) including information about at least one external electronic device, a state of which will be changed, according to one embodiment of the present invention.

The controller 201 may be configured to output related information or make a request for a user's approval through the output section 203 before transmitting the state setting information 303 to at least one external electronic device 301 when the operation mode 300 is changed, e.g. started, terminated or the like.

Referring to FIG. 8, the controller 201 controls a display 80 to display a UI including a guide 800 about the beginning of the movie mode, items 801 corresponding to the external electronic device 301 of which settings will be changed, and items 803 corresponding to the state setting information 303 to be transmitted to the external electronic device 301.

Through the UI displayed on the display 80, a user can be informed of the operation mode 300 to be started, the external electronic device 301 of which state will be changed, and the state setting information 303 to be transmitted to each external electronic device 301. In addition, a user may give an approval to the beginning of the mode through the user command input section 207.

For example, as shown in FIG. 8, since the movie mode begins in response to a user's selection, the electronic device 1 may be configured to inform a user of turning on the TV and closing the window to help him/her to concentrate on a movie before changing the state through the display 80 as the movie mode begins.

Referring to FIG. 9, the controller 201 controls a display 80 to display a UI including a guide 900 about the termination of the movie mode, items 901 corresponding to at least one external electronic device 301 of which settings will be changed, and items 903 corresponding to the state setting information to be transmitted to at least one external electronic device 301.

The controller 201 may change the state of at least one external electronic device 301 in response to the termination of the ongoing operation mode 300. As described above, at least one external electronic device 301 used in implementing the operation mode 300 may be returned to the setting state 700 previous to the beginning of the operation mode 300, but the state setting information 303 may be transmitted for changing the state of at least one external electronic device 301 to cope with the surrounding environment 400 in accordance with the surrounding environment 400.

For example, as shown in FIG. 9, since the movie mode is terminated in response to a user's selection, the electronic device 1 may inform a user of turning off the TV and opening the window for air ventilation through the display 80 before changing the states.

FIGS. 8 and 9 are merely given for convenience of description, and the descriptions are not limited to these examples. Alternatively, a user may be variously informed of at least one external electronic device of which state will be changed, and their state settings.

Figure 10:
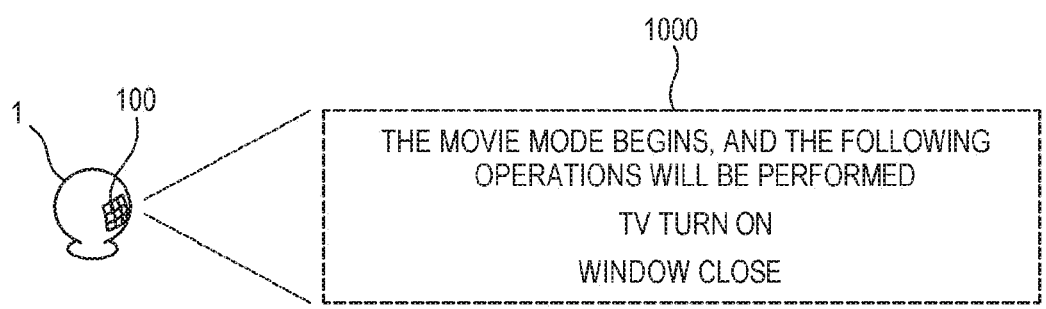
FIG. 10 illustrates a loudspeaker of outputting a sound including information about at least one external electronic device, a state of which will be changed, according to one embodiment of the present invention.
Figure 11:
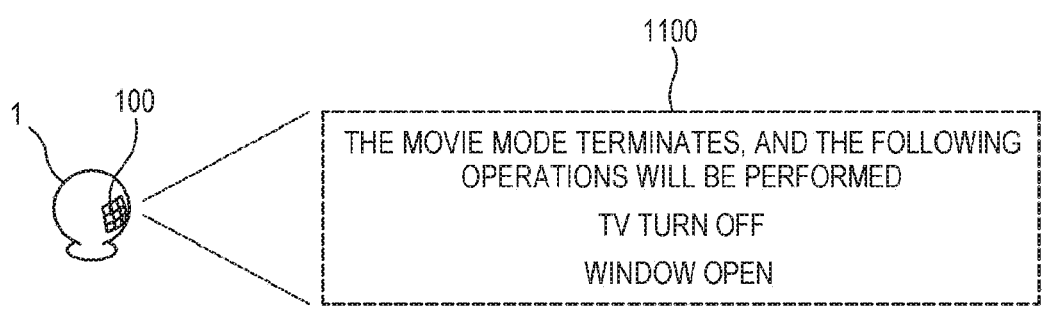
FIG. 11 illustrates a loudspeaker of outputting a sound including information about at least one external electronic device, a state of which will be changed, according to one embodiment of the present invention.

FIGS. 10 and 11 illustrate a loudspeaker of outputting a sound including information about at least one external electronic device, a state of which will be changed, according to one embodiment of the present invention.

The output section 203 may include a loudspeaker 100 for outputting a sound, and the loudspeaker 100 may output a sound involving information about at least one external electronic device 301 of which state will be changed as the operation mode 300 beings or terminates, under control of the controller 201.

FIG. 10 shows the loudspeaker 100 for outputting a sound 1000 with information about at least one external electronic device 301 of which state will be changed as the movie mode begins, and shows the loudspeaker 100 for outputting a sound 1100 with information about at least one external electronic device 301 of which state will be changed as the movie mode terminates.

As described above, the output section 203 may include either of the display 80 or the loudspeaker 100, and may also include a connector to which an external display device or an external loudspeaker is connected and through which information is transmittable. However, the output section 203 according to the disclosure is not limited to the drawings and descriptions, and may have any form as long as it can give a user the information about at least one external electronic device 301 to be changed in state.

In other words, as described with reference to FIG. 8 and FIG. 9, the electronic device 1 can give a user the information about the external electronic device 301, the state of which will be changed as the operation mode begins, visually through the display 80 and acoustically through the loudspeaker 100.

FIGS. 10 and 11 show examples of acoustically informing the external electronic devices 301 to be changed in state and their state setting information 303 as the movie mode begins and terminates.

Below, the display 80 will be described as a representative of the output section 203 for convenience of description.

Figure 12:
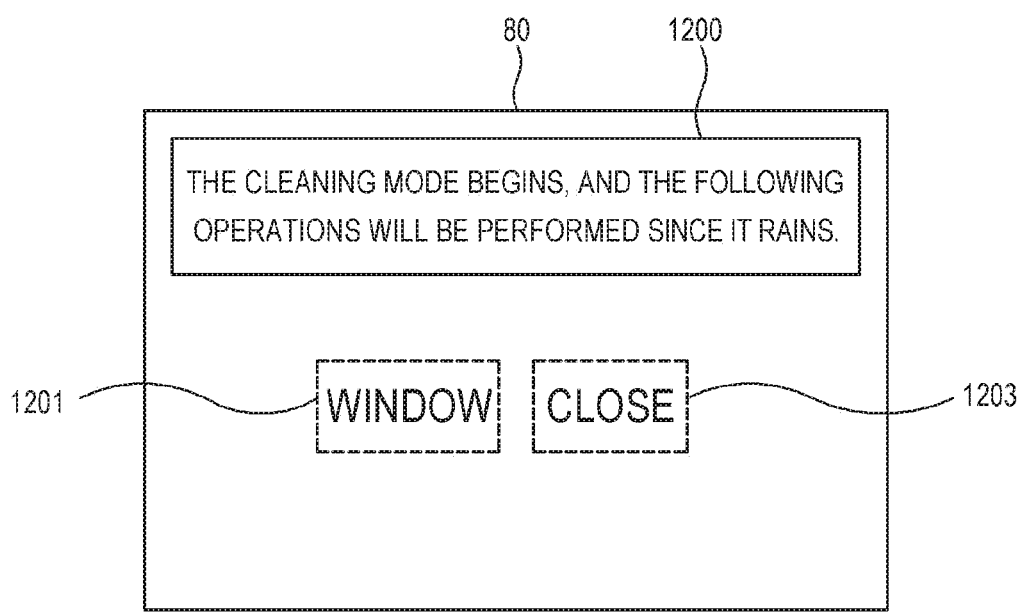
FIG. 12 illustrates an example of displaying information about an electronic device, which will be changed corresponding to an operation mode and a surrounding environment, when the operation mode starts, according to one embodiment of the present invention.

FIG. 12 illustrates an example of displaying information about an electronic device, which will be changed corresponding to an operation mode and a surrounding environment, when the operation mode starts, according to one embodiment of the present invention.

As described above, the controller 201 may be configured to transmit the state setting information 303 for changing the state to at least one external electronic device 301 mapped to the operation mode 300 and the surrounding environment when the operation mode begins.

Before transmitting the state setting information 303, the controller 201 also controls the display 80 to display a UI involving a guide 1200 for informing that the operation mode 300 begins and at least one external electronic device 301 will be changed in state to correspond to a user's favorite state, electronic device items 1201, and state setting items 1203.

For example, when the cleaning mode begins, it is previously set to open the window for fear that dust should rise. However, referring to FIG. 12, the electronic device 1 may be configured to provide information to a user not to open the window in consideration of the surrounding environment when it rains.

According to another embodiment, the electronic device 1 informs a user that it rains, recommends closing the window, closes the window in response to a user's approval.

Figure 13:
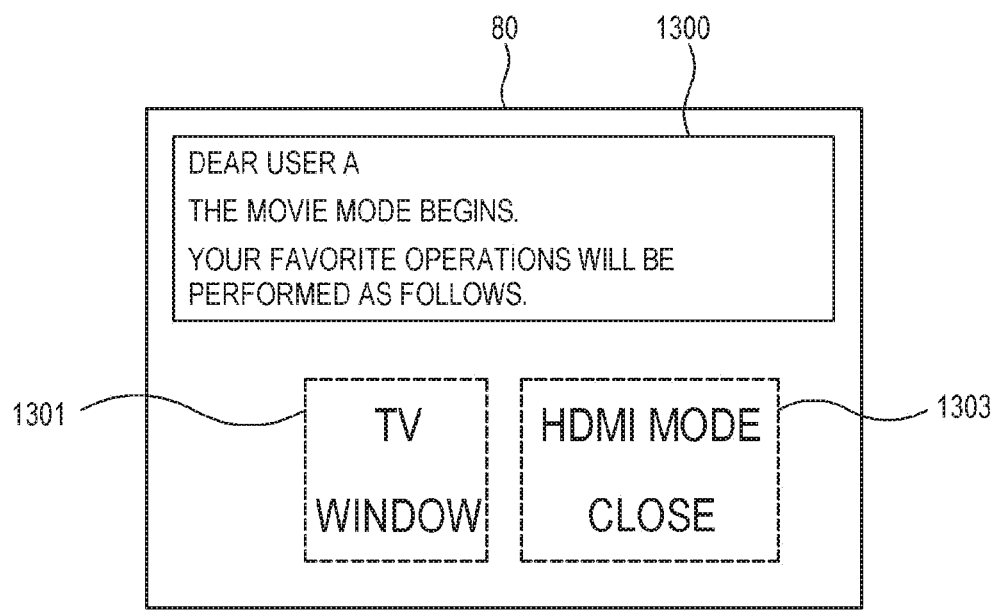
FIG. 13 illustrates an example of displaying information about an electronic device, which will be changed corresponding to an operation mode and a state preferred by a user, when the operation mode starts, according to one embodiment of the present invention.

FIG. 13 illustrates an example of displaying information about an electronic device, which will be changed corresponding to an operation mode and a state preferred by a user, when the operation mode starts, according to one embodiment of the present invention.

As described above, the storage 205 may be configured to store the user favorite state 600 of each user with regard to the plurality of operation modes 300, and the controller 201 may transmit the state setting information 303 for changing the states of the external electronic devices 2-$a$~2-$n$ to at least one external electronic device 301 in accordance with the operation mode 300 and the user favorite state 600 by identifying a user when the operation mode 300 starts.

Before transmitting the state setting information 303, the controller 201 controls the display 80 to display a UI involving a guide 1300 for informing that the operation mode 300 begins and at least one external electronic device 301 will be changed in state to correspond to a user's favorite state, electronic device items 1301, and state setting items 1303.

For example, it may be stored that a user A prefers to watch the TV in an HDMI mode by receiving data from a notebook computer or the like and completely close the window when the movie mode begins, unlike other users. Therefore, the electronic device 1 may be configured to inform the user A that the state of the TV will be changed to operate in the HDMI mode and the window will be closed, when sensing that the user A starts the movie mode.

According to another embodiment, when sensing that the user A starts the movie mode, the electronic device 1 may transmit the state setting information to enter the movie mode, recommend operations preferred by the user A, and change the state of at least one external electronic device 301 in response to an approval or change of the user A.

Figure 14:
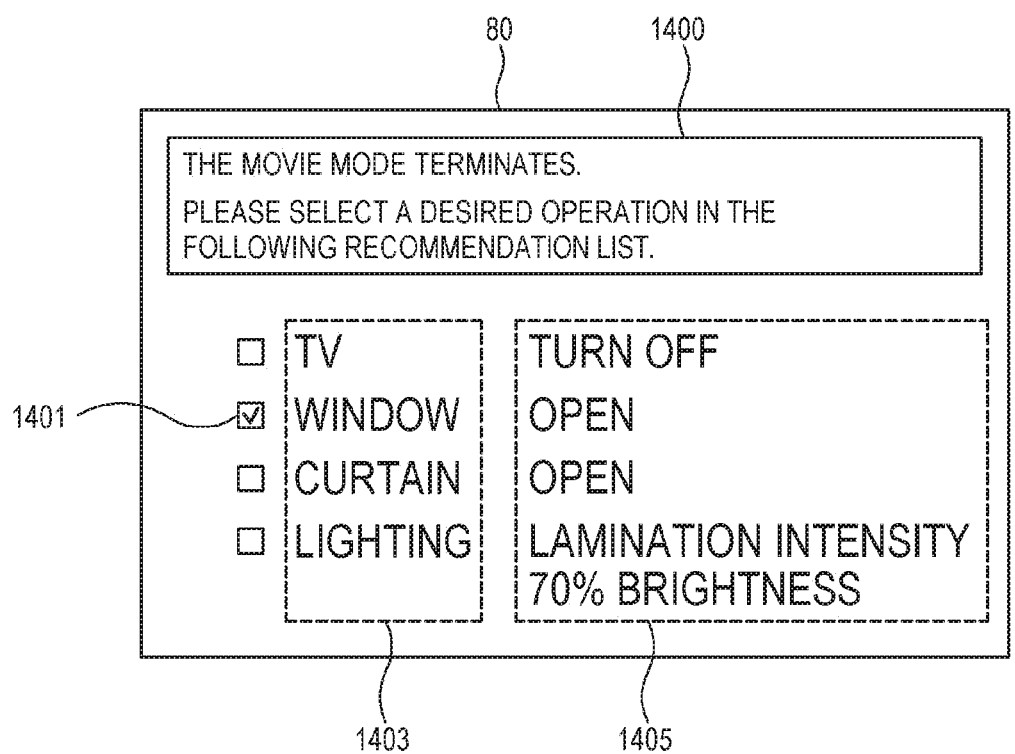
FIG. 14 illustrates an example of displaying a recommendation list, through which a user can select an electronic device to be controlled, according to one embodiment of the present invention.

FIG. 14 illustrates an example of displaying a recommendation list, through which a user can select an electronic device to be controlled, according to one embodiment of the present invention.

The controller 201 in this embodiment controls the display 80 to display a UI with a guide 1400 for informing the change, input items 1401, electronic device items 1403 and state setting items 1405 when at least one of the ongoing operation mode 300 and the surrounding environment 400 is changed.

The electronic device items 1403 correspond to at least one external electronic device 301 mapped onto at least one of the operation mode 300 and the surrounding environment 400 stored in the storage 205, and the state setting item 1405 corresponds to the state setting information 303 for changing the state of the external electronic device 301.

The controller 201 informs a user of a candidate external electronic device 301 corresponding to the surrounding environment 400 and the operation mode 300 changed through the UI displayed on the display 80.

A user inputs a control command through the displayed input items 1401, thereby deleting an undesired electronic device item 1403 or selecting a desired electronic device item 1403. To input the command, the input item may be selected by moving a cursor with a remote controller, a mouse, etc. or may be directly selected through a touch pad, or may be selected by a voice through a microphone.

For example, when the movie mode terminates, the electronic device 1 may recommend a user to change the state of at least one external electronic device 301 in response to the termination of the movie mode. The external electronic device 301 may be recommended through various algorithms. The state of at least one external electronic device 301 mapped to the termination of the movie mode may be recommended, or the state of at least one external electronic device 301 stored before starting the movie mode may be recommended. Further, after the movie mode terminates, a user may be recommended to change at least one external electronic device 301 based on the changes in the surrounding environments such as a timeslot, weather, etc.

FIG. 14 and the foregoing descriptions are just for illustrative purposes, and the controller 201 of the disclosure may display a UI of various types through the display 80 according to embodiments. As described above, the foregoing content may be acoustically output through the loudspeaker.

According to another embodiment, the displayed state setting item 1405 may be changed to change the state setting information to be transmitted to the external electronic device 301 selected by the controller 201. In more detail, the state setting item 1405 of FIG. 14 shows that the TV is turned off, the window is open, the curtain is open, and the lighting is turned up. Alternatively, a user may select the state setting items 1405 to turn on the TV, close the window, and control the illumination intensity by closing half the curtain, turning on the lighting by 30%, etc. Besides, items may be added to or deleted from the displayed electronic device items 1403. When a user adds or deletes the electronic device items 1403, the controller 201 may store it as the user favorite state 600 of the user.

Figure 15:
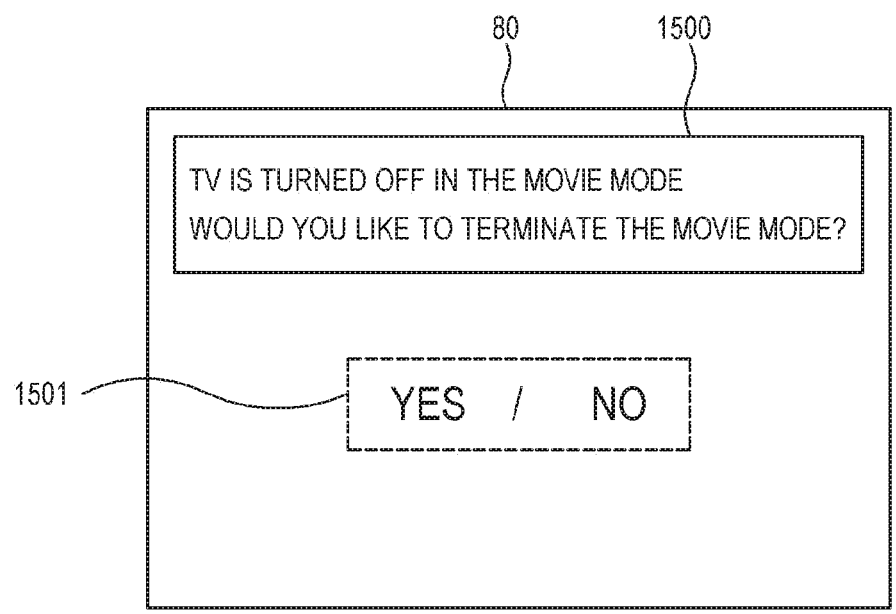
FIG. 15 illustrates an example of asking a user to confirm whether to terminate an operation mode as a user terminates use of an external electronic device during the operation mode according to one embodiment of the present invention.

FIG. 15 illustrates an example of asking a user to confirm whether to terminate an operation mode as a user terminates use of an external electronic device during the operation mode according to one embodiment of the present invention.

When an external interruption is sensed as use of at least one external electronic device 301 is terminated or at least unused one external electronic device 301 starts to be used while the operation mode 300 is in progress, the controller 201 controls the display 80 to display a UI involving a guide 1500 for asking a user to confirm whether to terminate or pause the operation mode, and an approval item 1501. To sense such an external interruption, the electronic device 1 may further include a sensor section or receive a sensing signal from a plurality of external sensing devices connected through the communicator 200, as described above.

The external interruption may be sensed when a user issues a control command such as pausing or the like, or when the state of one among the plurality of external electronic devices 2-*a*~2-*n* is changed or the surrounding environment 400 is changed while the operation mode 300 is in progress. When the interruption is sensed by the sensor section or the like, the controller 201 may ask a user for confirm whether to change or terminate the operation mode 300, and a user may confirm whether to continue the operation mode 300 through the approval item 1501.

For example, when a user turns off the TV while the movie mode is in progress, the controller 201 may be configured to display a UI for determining whether a user turns off the TV to pause the movie mode or terminate the movie mode. Likewise, when a user turns off the cleaner while the cleaning mode is in progress, the controller 201 may be configured to display a UI for determining whether a user wants to pause or terminate the cleaning mode.

Figure 16:
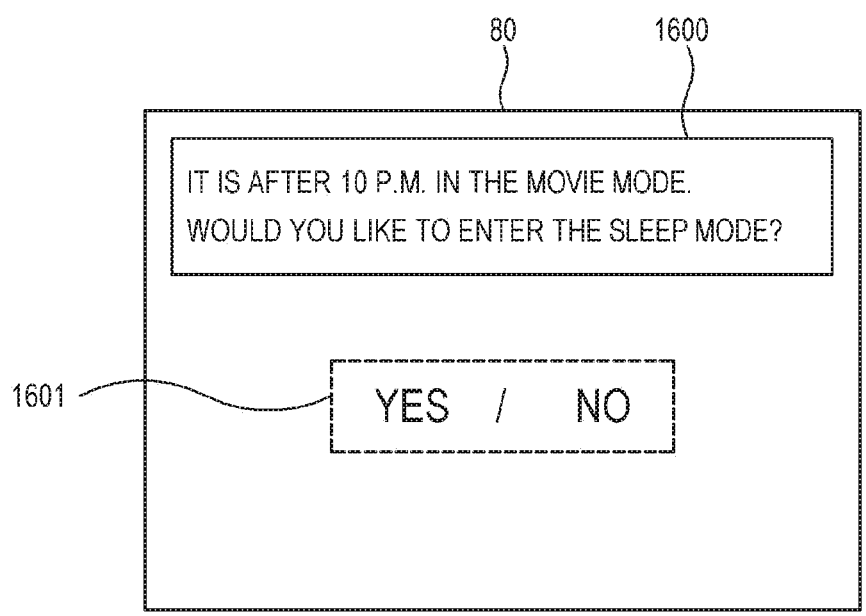
FIG. 16 illustrates an example of asking a user a confirmation before transmitting information about state settings corresponding to a surrounding environment changed during an operation mode according to one embodiment of the present invention.

FIG. 16 illustrates an example of asking a user a confirmation before transmitting information about state settings corresponding to a surrounding environment changed during an operation mode according to one embodiment of the present invention.

When the surrounding environment 400 is changed while the operation mode 300 is in progress, the controller 201 may change the state of at least one external electronic device 301 to cope with the changed surrounding environment 400 as described above. In this embodiment, it will be described by way of example that the operation mode 300 is changed in response to the changed surrounding environment 400 while the operation mode 300 is in progress.

For instance, when it reaches a bedtime previously set by a user while a study mode or the movie mode is in progress, the controller 201 may control the display 80 to display a UI involving a guide 1600 for informing a user that it is the time, and an approval item 1601. Thus, a user continues the ongoing operation mode 300 or changes the operation mode 300 as recommended by the electronic device 1.

Figure 17:
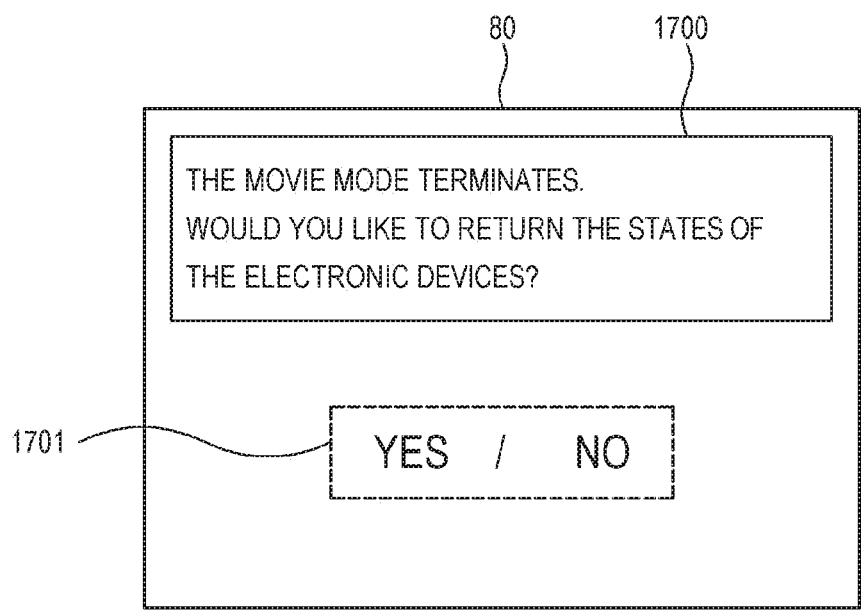
FIG. 17 illustrates an example of asking a user a confirmation before returning an external electronic device to a state previous to the beginning of an operation mode as the operation mode is terminated according to one embodiment of the present invention.

FIG. 17 illustrates an example of asking a user a confirmation before returning an external electronic device to a state previous to the beginning of an operation mode as the ongoing operation mode is terminated according to one embodiment of the present invention.

As described above, the storage 205 may be configured to store setting state 700 of the plurality of external electronic devices 2-*a*~2-*n* when the operation mode 300 begins. After the operation mode 300 terminates, there is a need of returning the setting state 700 of the used external electronic devices 2-*a*~2-*n* to those before the use in response to only a user's approval since it is inconvenient for a user to manually return the used external electronic devices 2-*a*~2-*n* one by one to the states previous to the beginning of the operation mode 300.

After the ongoing operation mode 300 terminates, the controller 201 controls the display 80 to display a UI involving a guide 1700 for informing a user that the operation mode 300 is terminated and asking him/her whether to return at least one external electronic device 301 used in the progress of the operation mode 300 to those previous to the beginning of the operation mode 300, and an approval item 1701. Thus, a user can select whether to return the states of the used external electronic devices 2-*a*-2-*n* to those before the beginning of the operation mode 300 or maintain the states, by simple control.

Figure 18:
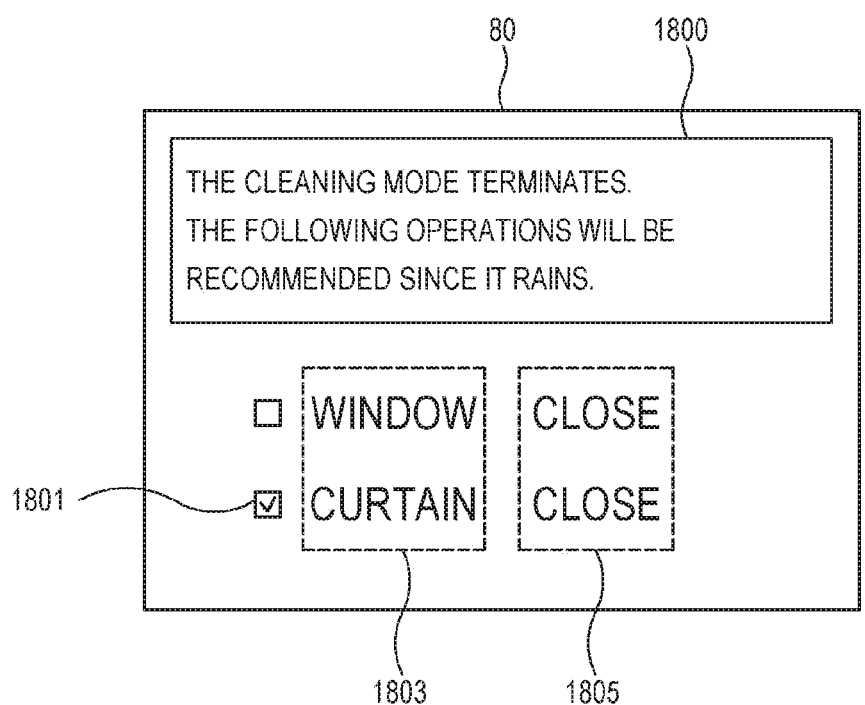
FIG. 18 illustrates an example of recommending a user to select at least one electronic device corresponding to a surrounding environment and state setting information for changing the state of the at least one electronic device as an operation mode is terminated according to one embodiment of the present invention.

FIG. 18 illustrates an example of recommending a user at least one external electronic device corresponding to a surrounding environment, and the state setting information for changing the state of the external electronic devices as an ongoing operation mode is terminated according to one embodiment of the present invention.

The controller 201 controls the display to display a UI involving a guide 1800 for informing that the ongoing operation mode 300 is terminated and the surrounding environment 400 is changed, input items 1801, electronic device items 1803, and state setting items 1805.

The surrounding environment 400 may be varied differently from that at a point of time when the operation mode 300 begins. The controller 201 is configured to sense whether the surrounding environment 400 is varied after the ongoing operation mode 300 is terminated, and recommend a user to change the state of at least one external electronic device 301 to cope with the sensed surrounding environment 400.

The electronic device item 1803 and the state setting item 1805 are mapped onto the surrounding environment 400, and correspond to the state setting information 303 for changing at least one external electronic device 301 and the states of the external electronic devices 2-*a*~2-*n* stored in the storage 205.

When a user checks the input items 1801 and selects at least one among the recommended external electronic device items 1803, the controller 201 transmits the state setting information 303 for changing the state to the selected external electronic devices 2-*a*~2-*n*.

For example, when the electronic device 1 senses the surrounding environment after the cleaning mode is terminated and determines that it rains, a user may be recommended to close the window and the curtain. The electronic device 1 may transmit the state setting information 303 to the plurality of external electronic devices 301 so that the operation can be performed in response to a user's selection, for example, to close the curtain but open the window even though it rains.

According to another embodiment, a user may add or delete the electronic device item 1803 or change the state setting item 1805 through the UI, as described above. When the electronic device item 1803 or the state setting item 1805 is changed, it may be provided as the user favorite state 600 of the corresponding user after the same operation mode 300 is terminated in the future.

Figure 19:
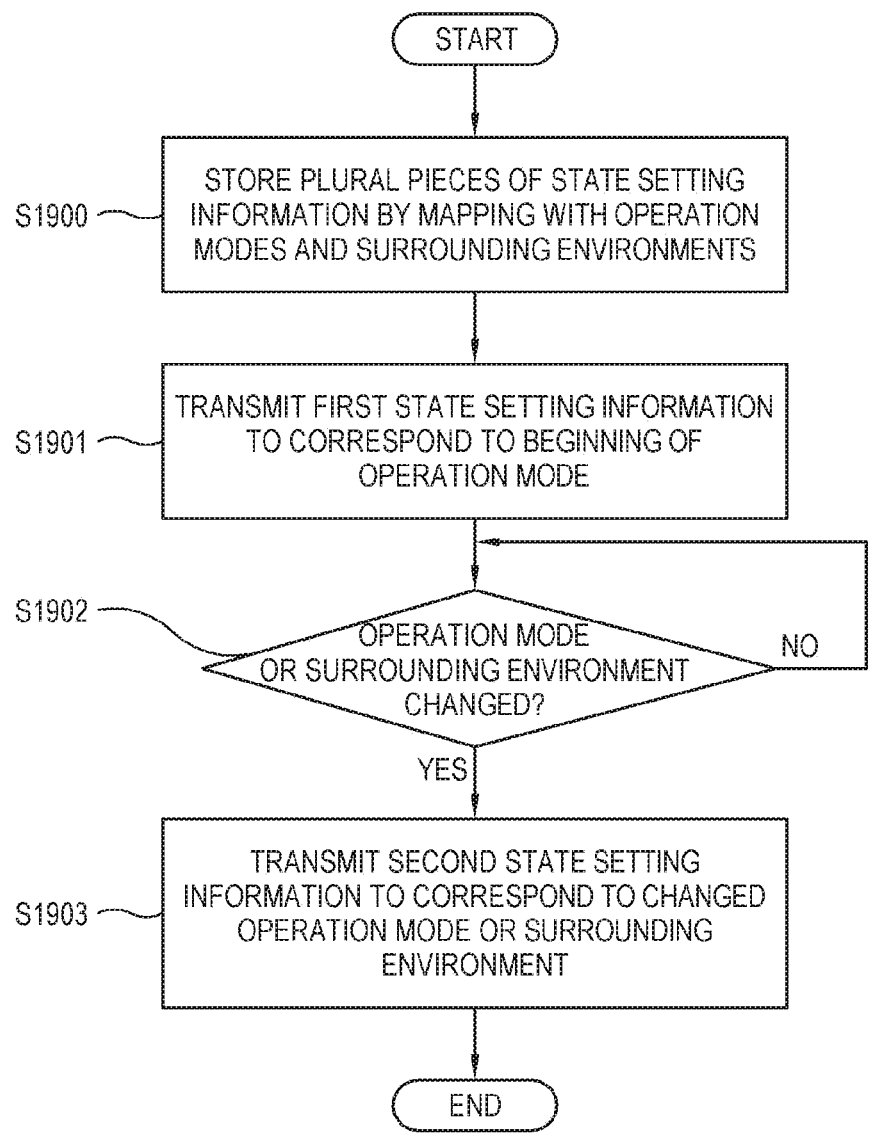
FIG. 19 is a flowchart of controlling an electronic device according to one embodiment of the present invention.

FIG. 19 is a flowchart of controlling an electronic device according to one embodiment of the present invention.

First, at operation S1900, the controller 201 controls the storage 205 to store a plurality of operation modes 300 relevant to a plurality of electronic devices, and a plurality of pieces of state setting information 303 for changing the states of the plurality of external electronic devices 2-a~2-n mapped to a plurality of surrounding environments 400. Then, at operation S1901, the controller 201 transmits first state setting information for changing the state of at least one among the plurality of external electronic devices 2-a~2-n corresponding to a started operation mode among the plurality of pieces of state setting information 303 through the communicator 200 when one among the plurality of operation modes 300 starts. Further, at operation S1902, it is sensed whether one of the operation mode 300 and the surrounding environment 400 is changed while the operation mode 300 is in progress, and the operation mode 300 is maintained when there are no changes, while continuing to sense whether there is a change. Last, when it is sensed that one of the operation mode 300 and the surrounding environment 400 is changed, at operation S1903 the controller 201 transmits the second state setting information, which is for changing the state of at least one among the plurality of external electronic devices 2-a~2-n to cope with at least one of the changed operation mode 300 and the changed surrounding environment 400, among the plurality of pieces of state setting information 303.

Figure 20:
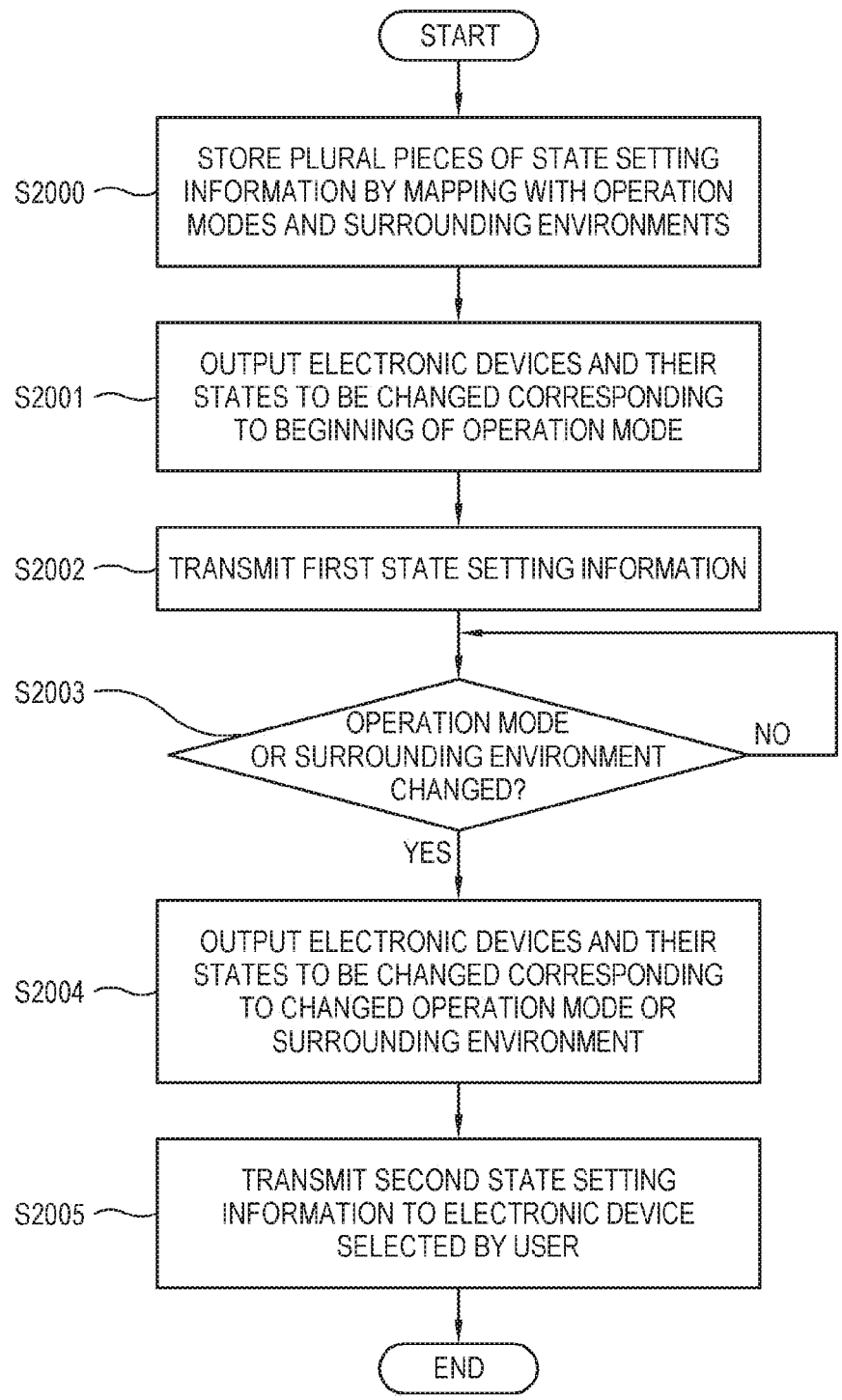
FIG. 20 is a flowchart of controlling an electronic device according to one embodiment of the present invention.

FIG. 20 is another flowchart of controlling an electronic device according to one embodiment of the present invention.

First, at operation S2000, the controller 201 controls the storage 205 to store a plurality of operation modes 300 relevant to a plurality of electronic devices, and a plurality of pieces of state setting information 303 for changing the state of the plurality of external electronic devices 2-a~2-n mapped onto the plurality of surrounding environments 400. Then, at operation S2001, the controller 201 controls the output section to output information about at least one external electronic device 301, the state of which will be changed, among the plurality of external electronic devices 2-a~2-n. Further, at operation S2002, the controller 201 transmits the first state setting information for changing the state of at least one external electronic device 301 through the communicator 200. Further, at operation S2003, it is sensed whether one of the operation mode 300 and the surrounding environment 400 is changed while the operation mode 300 is in progress, and the operation mode 300 is maintained when there are no changes, while continuing to sense whether there is a change. Then, when it is sensed that one of the operation mode 300 and the surrounding environment 400 is changed, at operation S2004 the controller 201 controls the output section 203 to provide at least one external electronic device 301 and the state setting information 303 corresponding to the changed operation mode or surrounding environment. Last, at operation S2005, the second state setting information for changing the state is transmitted to the electronic device 301 selected by a user among at least one provided external electronic device 301.

Figure 21:
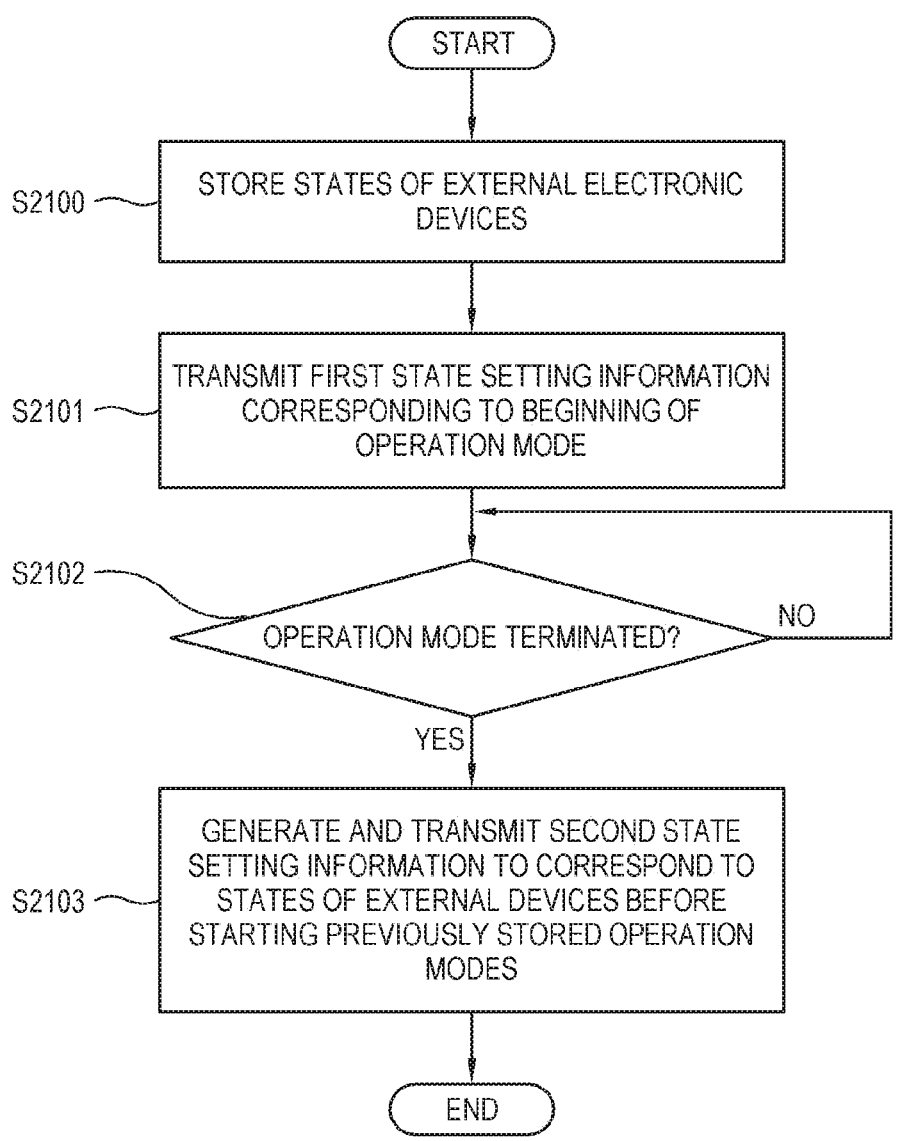
FIG. 21 is a flowchart of controlling an electronic device to return the electronic devices to states previous to the beginning of an operation mode when the operation mode is terminated according to one embodiment of the present invention.

FIG. 21 is a flowchart of controlling an electronic device to return the electronic devices to the states previous to the beginning of an operation mode when the operation mode is terminated according to one embodiment of the present invention.

First, at operation S2100, the controller 201 controls the storage 205 to store the states of the plurality of external electronic devices 2-a~2-n before the operation mode starts. Then, at operation S2101, the controller 201 transmits the first state setting information for changing the sates of at least one external electronic device 2-a~2-n to correspond to the started operation mode. Further, at operation S2102, the controller 201 determines whether the ongoing operation mode is terminated or not. When it is determined that the operation mode is terminated, at operation S2103 the controller 201 generates and transmits second state setting information to correspond to the states of the plurality of external electronic devices 2-a~2-n before the previously stored operation mode starts. This embodiment shows an example that the states of the plurality of external electronic devices 2-a~2-n are stored before starting the operation mode when a user selects starting the operation mode, and the state of at least one used external electronic device 2-a~2-n is returned to that previous to the beginning of the operation mode after the operation mode is terminated.

For example, the electronic device 1 in this embodiment turns on the TV, changes the TV to be in the HDMI mode, and turns down the lighting by closing the window and the curtain in accordance with the movie mode; and then turns off the TV, opens the window and the curtain and turn up the lighting again when the movie mode is terminated.

According to another embodiment, the electronic device 1 may ask a user a confirmation whether to return the state of at least one external electronic device 2-a~2-n before returning the state after the operation mode is terminated, or recommend a user to return the state of at least one electronic device 1 used in the operation mode to that previous to the beginning of the operation mode.

DESCRIPTION OF REFERENCE NUMERALS

1—electronic device
200—communicator
201—controller
203—output section
205—storage
207—user input section
300—operation mode

The invention claimed is:

1. An electronic device comprising:
a communicator configured to communicate with a plurality of external electronic devices having a plurality of changeable states;
a storage configured to store a plurality of state setting information mapped on to a plurality of operation modes relevant to the plurality of external electronic devices and a plurality of surrounding environments, and provided for changing the states of the plurality of external electronic devices; and
a controller configured to:
based on a function of a first external electronic device among the plurality of external electronic devices being executed by a user, identify a second external electronic device whose state is to be changed according to the executed function,
control the communicator to transmit, to the identified second external electronic device, first state setting information for changing the state of the identified second external electronic device among the plurality of state setting information,
based on identifying that the executed function is terminated, identify that a surrounding environment when the function is terminated is changed from a surrounding environment when the function is started,
based on the surrounding environment being changed, control the communicator to transmit, to the identified second external electronic device, second state setting information for setting the state of the identified second external electronic device corresponding to the changed surrounding environment, and based on the surrounding environment not being changed, control the communicator to transmit, to the identified second external electronic device, third state setting information for returning the state of the identified second external electronic device corresponding to when the function is started, wherein the first state setting information comprises state setting information corresponding to the user among the plurality of state setting information which are stored to be mapped on to a plurality of users.

2. The electronic device according to claim 1, wherein, based on an operation mode corresponding to the function of the first external electronic device starting, the controller controls the communicator to transmit the first state setting information for changing the state of the identified second external electronic device to correspond to the surrounding environment and the started operation mode.

3. The electronic device according to claim 1, further comprising:

an output section, wherein the controller controls the output section to output information about the identified second external electronic device whose state is to be changed.

4. The electronic device according to claim 3, wherein the information comprises information about the state of the identified second external electronic device to be changed.

5. The electronic device according to claim 3, wherein the output section comprises a loudspeaker configured to output a sound comprising information about the identified second external electronic device.

6. The electronic device according to claim 3, wherein the output section comprises a display configured to display a user interface (UI) comprising an item corresponding to the identified second external electronic device.

7. The electronic device according to claim 3, further comprising:

a user command input section, wherein the information comprises information about a plurality of candidate electronic devices selectable as the second external electronic device of which state will be changed, and wherein the controller changes the state of at least one candidate electronic device selected among the plurality of candidate electronic devices by the user through the user command input section.

8. The electronic device according to claim 1, wherein the controller is further configured to:

based on the function of the first external electronic device being started, store information about the state previous to changing the state of the second external electronic device in the storage, and based on the function of the first external electronic device being terminated and the surrounding environment not being changed, transmit the third state setting information for returning the state of the second external electronic device to the state previous to changing the state of the second external electronic device.

9. The electronic device according to claim 2, wherein the operation mode is changeable in accordance with at least one operation among the plurality of external electronic devices.

10. The electronic device according to claim 1, wherein the surrounding environment comprises at least one of a timeslot, illumination intensity or weather.

11. The electronic device according to claim 2, wherein at least one of the first state setting information and the second state setting information comprises information about a user favorite state, which corresponds to the operation mode and the surrounding environment when the state is changed, among a plurality of user favorite states relevant to the plurality of external electronic devices.

12. A method of controlling an electronic device communicable with a plurality of external electronic devices having a plurality of changeable states, the method comprising:

storing a plurality of state setting information mapped on to a plurality of operation modes relevant to the plurality of external electronic devices and a plurality of surrounding environments, and provided for changing the states of the plurality of external electronic devices;

based on a function of a first external electronic device among the plurality of external electronic devices being executed by a user, identifying a second external electronic device whose state is to be changed according to the executed function;

transmitting, to the identified second external electronic device, first state setting information for changing the state of the identified second external electronic device among the plurality of state setting information;

based on identifying that the executed function is terminated, identify that a surrounding environment when the function is terminated is changed from a surrounding environment when the function is started;

based on the surrounding environment being changed, transmitting, to the identified second external electronic device, second state setting information for setting the state of the identified second external electronic device corresponding to the changed surrounding environment; and based on the surrounding environment not being changed, transmitting, to the identified second external electronic device, third state setting information for returning the state of the identified second external electronic device corresponding to when the function is started, wherein the first state setting information comprises state setting information corresponding to the user among the plurality of state setting information which are stored to be mapped on to a plurality of users.

13. The method according to claim 12, wherein the transmitting of the first state setting information comprises:

based on an operation mode corresponding to the function of the first external electronic device starting, transmitting the first state setting information for changing the state of the identified second external electronic device to correspond to the surrounding environment and the started operation mode.

14. The method according to claim 12, further comprising outputting information about the identified second external electronic device whose state is to be changed through an output section.

* * * * *